US009361248B2

(12) United States Patent
Parks et al.

(10) Patent No.: US 9,361,248 B2
(45) Date of Patent: *Jun. 7, 2016

(54) I/O CO-PROCESSOR COUPLED HYBRID COMPUTING DEVICE

(71) Applicant: MICROSOFT TECHNOLOGY LICENSING, LLC, Redmond, WA (US)

(72) Inventors: Gregory H. Parks, Redmond, WA (US); Erik Michael Geidl, Moscow, ID (US); Andrew John Fuller, Redmond, WA (US); Troy Scott Jones, Aiea, HI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/644,193

(22) Filed: Mar. 10, 2015

(65) Prior Publication Data

US 2015/0186305 A1 Jul. 2, 2015

Related U.S. Application Data

(63) Continuation of application No. 13/040,233, filed on Mar. 3, 2011, now Pat. No. 9,003,208, which is a continuation of application No. 11/627,835, filed on Jan. 26, 2007, now Pat. No. 7,925,900.

(51) Int. Cl.
*G06F 1/26* (2006.01)
*G06F 1/32* (2006.01)
(Continued)

(52) U.S. Cl.
CPC ............ *G06F 13/122* (2013.01); *G06F 1/3203* (2013.01); *G06F 1/3293* (2013.01); *G06F 13/102* (2013.01); *G06F 1/266* (2013.01); *G06F 1/3243* (2013.01); *Y02B 60/121* (2013.01)

(58) Field of Classification Search
CPC ..... G06F 1/266; G06F 1/3203; G06F 1/3243; G06F 1/3293
USPC ........... 713/300, 320, 323, 330; 712/1, 28, 31
See application file for complete search history.

(56) References Cited

U.S. PATENT DOCUMENTS 6,301,609 B1 10/2001 Aravamudan
6,487,548 B1 11/2002 Leymann
(Continued)

FOREIGN PATENT DOCUMENTS

CN 1734400 A 2/2006
JP 2003-323417 A 11/2003
(Continued)

OTHER PUBLICATIONS

TRS-80 Model II, Wikipedia, page last modified on Mar. 22, 2015.
(Continued)

*Primary Examiner* — Michael J Brown
(74) *Attorney, Agent, or Firm* — Judy Yee; John Jardine; Micky Minhas

(57) ABSTRACT

An apparatus and method provide power to perform functions on a computing device. In one example, the apparatus contains multiple processors that may operate at different power levels to consume different amounts of power. Also, any of the multiple processors may perform different functions. For example, one processor may be a low power processor that may control or operate at least one peripheral device to perform a low capacity function. Control may also switch from the low power processor to a high capacity processor. In one example, the high capacity processor controls the low power processor and further controls the at least one peripheral device through the lower power processor.

20 Claims, 9 Drawing Sheets

(51) Int. Cl.
*G06F 13/12* (2006.01)
*G06F 13/10* (2006.01)

(56) References Cited

U.S. PATENT DOCUMENTS

| | | |
|---|---|---|
| 6,631,474 B1 | 10/2003 | Cai |
| 6,950,823 B2 | 9/2005 | Amiri |
| 6,996,828 B1 | 2/2006 | Kimura |
| 7,158,969 B2 | 1/2007 | Dettinger |
| 7,590,712 B2 | 9/2009 | Chambers |
| 7,721,118 B1 | 5/2010 | Tamasi |
| 7,805,425 B2 | 9/2010 | Cox |
| 7,925,900 B2 | 4/2011 | Parks |
| 7,933,888 B2 | 4/2011 | Cox |
| 8,384,700 B2 | 2/2013 | Parks |
| 9,003,208 B2 * | 4/2015 | Parks ............ G06F 1/3203 712/1 |
| 2002/0095609 A1 | 7/2002 | Tokunaga |
| 2003/0153354 A1 | 8/2003 | Cupps |
| 2003/0188077 A1 | 10/2003 | Watts, Jr. |
| 2004/0039742 A1 | 2/2004 | Barsness |
| 2004/0133538 A1 | 7/2004 | Amiri |
| 2004/0177200 A1 | 9/2004 | Chu |
| 2004/0268166 A1 | 12/2004 | Farkas |
| 2005/0066209 A1 | 3/2005 | Kee |
| 2005/0132239 A1 | 6/2005 | Athas |
| 2005/0165880 A1 | 7/2005 | Moody |
| 2005/0215252 A1 | 9/2005 | Jung |
| 2005/0216595 A1 | 9/2005 | Miyata |
| 2005/0268072 A1 | 12/2005 | Najam |
| 2005/0285864 A1 | 12/2005 | Diamond |
| 2006/0047782 A1 | 3/2006 | Niemi |
| 2006/0064473 A1 | 3/2006 | Borella |
| 2006/0080130 A1 | 4/2006 | Choksi |
| 2006/0095593 A1 | 5/2006 | Kranich |
| 2006/0129852 A1 | 6/2006 | Bonola |
| 2006/0129861 A1 | 6/2006 | Kee |
| 2006/0294401 A1 | 12/2006 | Munger |
| 2007/0094444 A1 | 4/2007 | Sutardja |
| 2007/0168336 A1 | 7/2007 | Ransil |
| 2013/0151874 A1 | 6/2013 | Parks |

FOREIGN PATENT DOCUMENTS

| | | |
|---|---|---|
| KR | 10-2003-0032571 A | 4/2003 |
| WO | 03/083694 A1 | 10/2003 |

OTHER PUBLICATIONS

Tandy Radio Shack, TRS 80 Model 16, Downloaded from Old-Computers.com, Apr. 21, 2015.

PCT International Search Report and Written Opinion for Application No. PCT/US2007/001978, May 23, 2007.
CN Notice on the First Office Action for Application No. 200780015000.7, Oct. 8, 2010.
CN Notice on the Second Office Action for Application No. 200780015000.7, Mar. 8, 2011.
EP Communication for Application No. 07709834.1-2201 12024877 PCT/US2007001978, Nov. 30, 2009.
Acharya, "Unleashing the Power of Wearable Devices in a SIP Infrastructure" Proceedings of the 3rd IEEE International Conference on Pervasive Computing and Communications (PerCom 2005), Mar. 8-12, 2005.
EP Communication for Application No. 07709834.1-2201 12024877, Jan. 29, 2010.
EP Communication for Application No. 07709834.1-2201, Dec. 2, 2010.
EP Communication for Application No. 07709834.1-2201, May 25, 2011.
KR Notice of Preliminary Rejection for Application No. 1 0-2008-7025998, Mar. 13, 2013.
PCT International Search Report and Written Opinion for Application No. PCT/US2007/089228, May 30, 2008.
CN Notice on the First Office Action for Application No. 200780050380.8, Aug. 12, 2010.
CN Notice on the Second Office Action for Application No. 200780050380.8, Jul. 7, 2011.
EP Communication for Application No. 07870146.3-2224 1 2106579 PCT/US2007089228, Jan. 3, 2013.
JP Notice of Rejection for Application No. 2009-547250, Aug. 3, 2012.
JP Final Rejection for Application No. 2009-547250, Dec. 7, 2012.
KR Notice of Preliminary Rejection for Application No. 1 0-2009-7014854, Mar. 27, 2013.
Scott Jones, "Solving the Form Factor Problem: The Polymorphic PC", Lifestyle mobile PCs for everyone, Mobile PC Business Unit, ThinkWeek May 2006.
U.S. Appl. No. 11/627,835, filed Jan. 26, 2007, Gregory H. Parks.
U.S. Appl. No. 13/040,233, filed Mar. 3, 2011, Gregory H. Parks.
U.S. Appl. No. 11/413,231, filed Apr. 28, 2006, Shaun David Cox.
U.S. Appl. No. 12/850,603, filed Aug. 4, 2010, Shaun David Cox.
U.S. Appl. No. 11/627,860, filed Jan. 26, 2007, Gregory H. Parks.
U.S. Appl. No. 13/763,658, filed Feb. 9, 2013, Gregory H. Parks.
IN First Examination Report for Application No. 4690/CHENP/2008, Sep. 18, 2015.
EP Communication for Application No. 07870146.3-1954, Reference EP65844TE900kap, Dec. 17, 2014.
EP Intention to grant for Application No. 07870146.3-1954, Reference EP65844TE900kap, Jun. 24, 2015.

* cited by examiner

I/O CO-PROCESSOR COUPLED HYBRID COMPUTING DEVICE

RELATED APPLICATIONS

This Application is a Continuation of, and claims benefit from, U.S. patent application Ser. No. 13/040,233, that was filed on Mar. 3, 2011, and that is a Continuation of U.S. patent application Ser. No. 11/627,835, (U.S. Pat. No. 7,925,900) that was filed on Jan. 26, 2007, (Issued Apr. 12, 2011), each of which is incorporated herein by reference in its entirety.

BACKGROUND

Portable electronic computing devices have become vastly popular. Many functions may be performed on these devices. However, these functions require power to perform. Power is often provided by portable means such as a battery that becomes depleted of energy over time. In this case, the battery needs to be recharged or replaced prior to continued use of the device. The lifespan of the battery depends in most part on the degree of use of the device and/or the functions performed on the device. Some functions require more power than other functions. Therefore, depending on which functions are performed at a given frequency, the battery may need to be recharged very frequently.

When the battery needs to be recharged or replaced frequently, the user of the device may become frustrated. What is needed is an apparatus or system that can prolong the lifespan of a battery so that excessively frequent recharging of the battery is not needed.

At the same time, when performing different functions on the portable device, state may need to be maintained to preserve the user experience on the device. In this way, connectivity is maintained such that the device need not tear down a present state and rebuild the state again after re-establishing the function or a new function.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, a hybrid computing device is described containing at least two processors and at least one peripheral device. One processor may operate in a higher power mode than another and may power or control a peripheral device. In another example, control may switch from one processor to another processor in the hybrid computing device which may depend on the power needs of a requested function.

In another example, a method is described for controlling a peripheral device in a computing device with a low power processor and switching control to a higher power processor based on a requested function and corresponding power need.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of computing systems.

Figure 1:
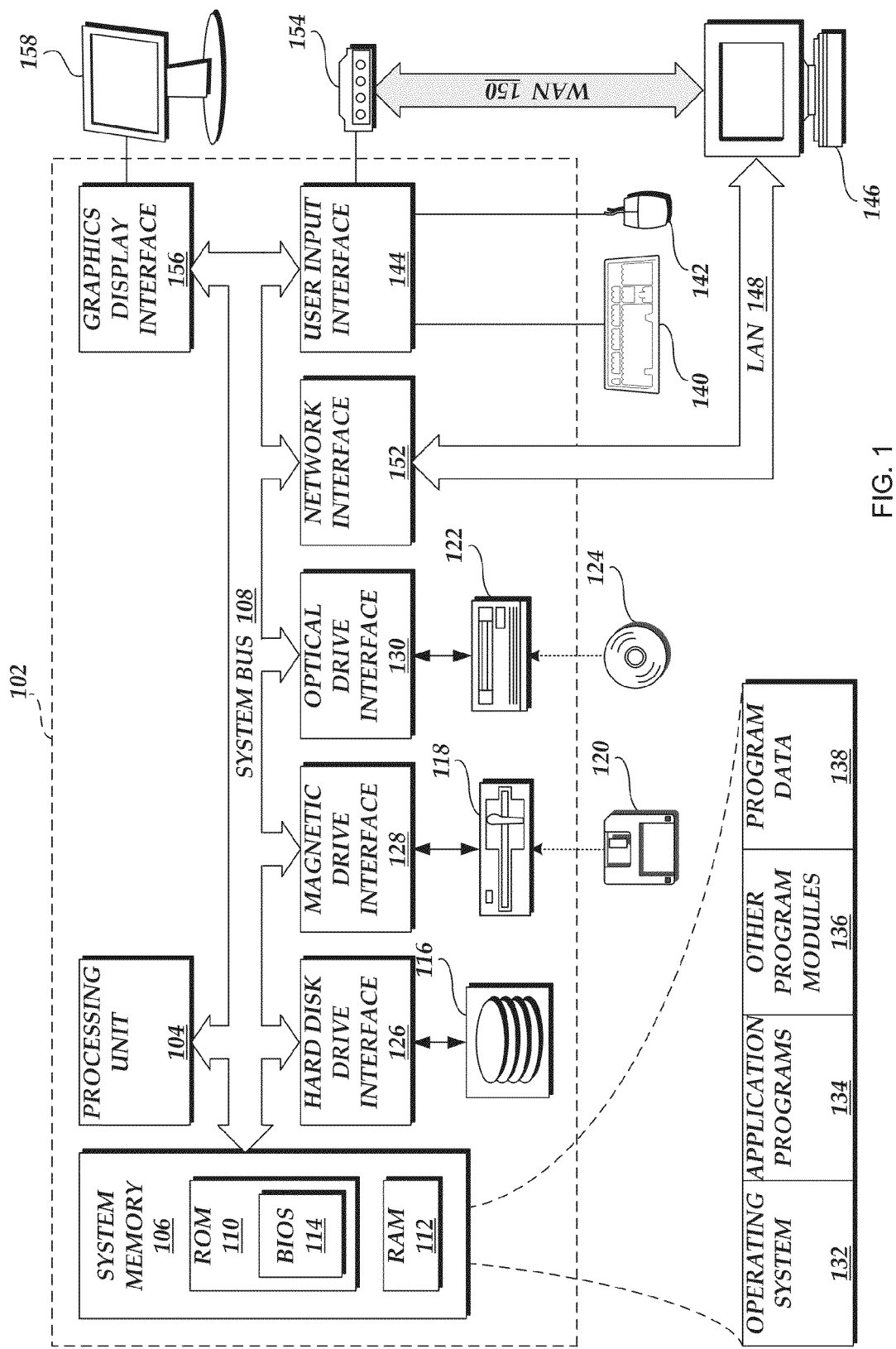
FIG. 1 illustrates an example of a suitable computing system environment in which computing subsystems may provide processing functionality.

FIG. 1 illustrates an example of a suitable computing system environment or architecture in which computing subsystems may provide processing functionality. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The method or system disclosed herein is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 102. Components of computer 102 may include, but are not limited to, a processing unit 104, a system memory 106, and a system bus 108 that couples various system components including the system memory to the processing unit 104. The system bus 108 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 102 typically includes a variety of computer readable media. Computer readable media can be any available media that can be accessed by computer 102 and includes both volatile and nonvolatile media, removable and non-removable media. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 102. Combinations of the any of the above are also be included within the scope of computer storage media. The term "computer storage medium" and the like as used herein refers to a statutory article of manufacture that is not a signal or carrier wave per se.

The system memory 106 includes computer storage media in the form of volatile and/or nonvolatile memory such as read only memory (ROM) 110 and random access memory (RAM) 112. A basic input/output system 114 (BIOS), containing the basic routines that help to transfer information between elements within computer 102, such as during start-up, is typically stored in ROM 110. RAM 112 typically contains data and/or program modules that are immediately accessible to and/or presently being operated on by processing unit 104. By way of example, and not limitation, FIG. 1 illustrates operating system 132, application programs 134, other program modules 136, and program data 138.

The computer 102 may also include other removable/non-removable, volatile/nonvolatile computer storage media. By way of example only, FIG. 1 illustrates a hard disk drive 116 that reads from or writes to non-removable, nonvolatile magnetic media, a magnetic disk drive 118 that reads from or writes to a removable, nonvolatile magnetic disk 120, and an optical disk drive 122 that reads from or writes to a removable, nonvolatile optical disk 124 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 116 is typically connected to the system bus 108 through a non-removable memory interface such as interface 126, and magnetic disk drive 118 and optical disk drive 122 are typically connected to the system bus 108 by a removable memory interface, such as interface 128 or 130.

The drives and their associated computer storage media discussed above and illustrated in FIG. 1, provide storage of computer readable instructions, data structures, program modules and other data for the computer 102. In FIG. 1, for example, hard disk drive 116 is illustrated as storing operating system 132, application programs 134, other program modules 136, and program data 138. Note that these components can either be the same as or different from additional operating systems, application programs, other program modules, and program data, for example, different copies of any of the elements. A user may enter commands and information into the computer 102 through input devices such as a keyboard 140 and pointing device 142, commonly referred to as a mouse, trackball or touch pad. Other input devices (not shown) may include a microphone, joystick, game pad, pen, scanner, or the like. These and other input devices are often connected to the processing unit 104 through a user input interface 144 that is coupled to the system bus, but may be connected by other interface and bus structures, such as a parallel port, game port or a universal serial bus (USB). A monitor 158 or other type of display device is also connected to the system bus 108 via an interface, such as a video interface or graphics display interface 156. In addition to the monitor 158, computers may also include other peripheral output devices such as speakers (not shown) and printer (not shown), which may be connected through an output peripheral interface (not shown).

The computer 102 may operate in a networked environment using logical connections to one or more remote computers, such as a remote computer. The remote computer may be a personal computer, a server, a router, a network PC, a peer device or other common network node, and typically includes many or all of the elements described above relative to the computer 102. The logical connections depicted in FIG. 1 include a local area network (LAN) 148 and a wide area network (WAN) 150, but may also include other networks. Such networking environments are commonplace in offices, enterprise-wide computer networks, intranets and the Internet.

When used in a LAN networking environment, the computer 102 is connected to the LAN 148 through a network interface or adapter 152. When used in a WAN networking environment, the computer 102 typically includes a modem 154 or other means for establishing communications over the WAN 150, such as the internet. The modem 154, which may be internal or external, may be connected to the system bus 108 via the user input interface 144, or other appropriate mechanism. In a networked environment, program modules depicted relative to the computer 102, or portions thereof, may be stored in the remote memory storage device. By way of example, and not limitation, remote application programs may reside on a memory device. It will be appreciated that the network connections shown are exemplary and other means of establishing a communications link between the computers may be used.

In one example, a hybrid computing device, such as a hybrid PC, is provided in which the hybrid computing device includes a plurality of processors. One of the processors in the plurality of processors may have higher power requirements than a second processor in the plurality of processors such that the processor having the higher power requirement may require more power or may consume more power than the second processor. Also, the processor having the higher power requirement may perform operations and functions that are unavailable with the second processor. Thus, in this example, the second processor in the plurality of processors of the hybrid computing device consumes less power than the processor consuming more power but may also have reduced functionality as compared with the higher power processor.

In an example of a hybrid computing device powered by a portable power source such as a battery, the device may consume power provided by the power source (e.g., battery) which in turn may lose power and may eventually need to be replaced or recharged after the power source has been depleted of energy. Depending on the type of use of the device, power from the battery can be depleted rapidly. For example, if a user of the device uses the device to perform high performance type functions, battery life may appear short and may need frequent recharging. The device may include any number or type of connected peripheral devices. For example, the hybrid PC may include a disc drive, a display, a 3G wireless card, WiFi network card, etc. Any of the peripheral devices may be powered or controlled by any processor capable of powering or controlling the corresponding peripheral device. Depending on the power needs of the peripheral device, a processor may be selected to control or power the peripheral device. For example, a high performance peripheral device may be controlled by a high performance processor while an energy-saving low power peripheral device may be controlled by a low power processor.

Battery life may be extended by consuming less power. However, certain tasks with certain peripheral devices may require certain minimum amount of energy to be performed. If this amount of needed energy is high, then a processor may be selected for controlling the device or peripheral device accordingly. Therefore, in this example, different processors may be provided in the hybrid PC device where different processors may have different energy needs or may consume different amounts of power for different tasks. Also, different processors may have different functionality. For example, a first processor may be a processor with a lower power requirement and may be unable to perform certain high performance functions or control corresponding peripheral devices for performing the functions that a second processor may be able to perform. In one example, a task may require a large amount of power consumption or may be a high performance function on a particular peripheral device. The processor capable of controlling the performance of the higher performance function may be invoked such that control of the device or any connected device may be switched to the high performance processor for performance of the desired higher performance function.

Figure 2:
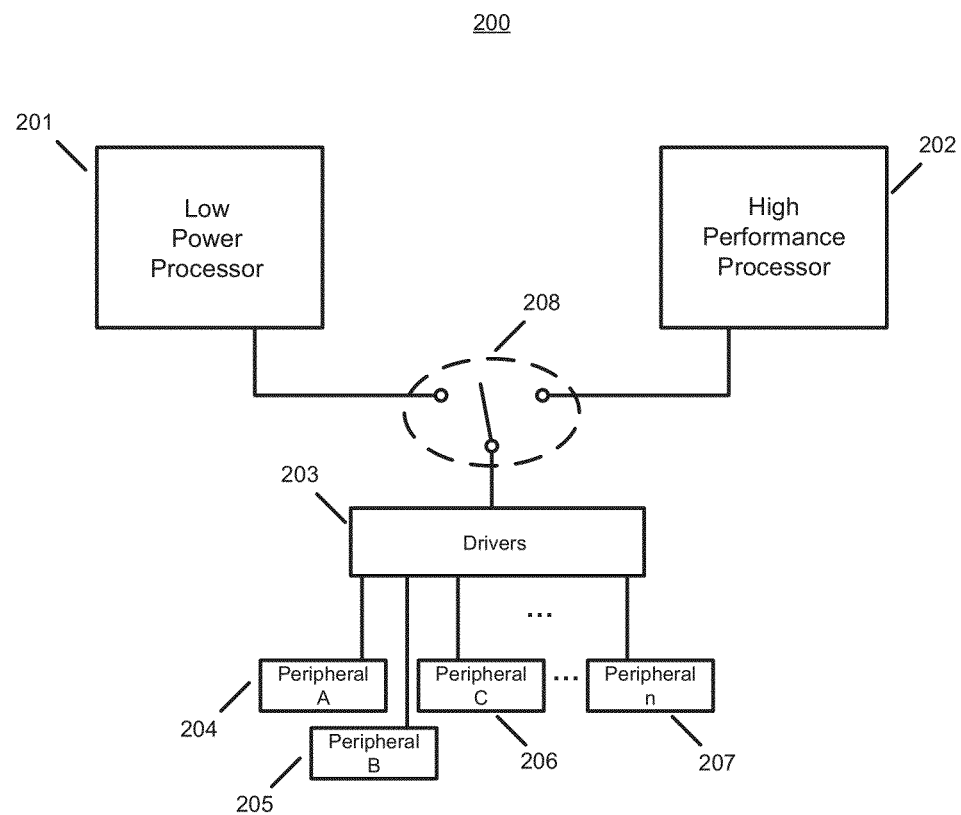
FIG. 2 illustrates one example of a hybrid computing device.

FIG. 2 illustrates one example of a hybrid computing device. In this example, a hybrid computing device 200 includes a plurality of processors. FIG. 2 illustrates two processors, however, any number of processors may be included in a hybrid computing device. For example, 3, 4, 5, 6, 10, or more processors may be included in the hybrid computing device. Additionally, any of the processors may have any level of power consumption or functionality. The level of power consumption may depend, for example, in the function being performed or controlled and/or the peripheral device being controlled.

As illustrated in the example of FIG. 2, the hybrid computing device 200 may include a low power processor 201 and a high performance processor 202. The high performance processor 202 may perform various functions of the device or may control certain peripheral devices for performing corresponding functions. The functions being performed may include high performance functions that consume high levels of power. For example, the high performance processor 202 may include an operating system for performing any number of high performance functions or graphics subsystems. The hybrid computing device 200 may further include a low power processor 201 that may consume less power than the high performance processor 202 but may also provide reduced functionality.

Also illustrated in FIG. 2, any number of peripherals may be controlled or powered by any of the processors. In one example, high performance functions are desired such that the high performance processor 202 controls the peripheral devices (204, 205, 206, 207) via a peripheral device driver 203. When lower performance is sufficient for a desired level of functionality of the hybrid device, control of any of the peripheral devices (204, 205, 206, or 207) may change to the low power processor 201 from the high performance processor 202. In this example, a switch 208 is provided in the device for switching between the different processors in the device. The switch 208 may take many forms. For, example, the switch 208 could be a physical switch, or the coordination of control of a memory bus, or any other form of microcode based on control switching.

In one example, the switch 208 may be activated based on the use of the device. When a function for which a low level of power may be used to be performed is requested, the low power processor 201 may automatically be selected such that the switch 208 may be positioned such that the low power processor 201 provides power to the peripheral devices (204, 205, 206, 207) and/or controls the peripheral devices. Alternatively, when a function needing a higher level of power to be performed is requested, the switch 208 may automatically switch to the high performance processor 202 such that the high performance processor 202 provides power to the peripheral devices (204, 205, 206, 207) to control the peripheral devices. For example, a driver or a module within the low power processor and/or high performance processor 202 may receive a command for a function from a user and may compare the requested function with a database of functions that may further indicate the level of power needed to perform the function. If the level of power needed is below a certain threshold level, the low power processor 201 may be selected for powering or controlling the peripheral devices (204, 205, 206, 207). Conversely, if the level of power needed is above a certain threshold level, the high performance processor 202 may be selected for powering or controlling the peripheral devices (204, 205, 206, 207).

In another example, a manual switch may be provided such that a user may manually switch from one processor to another in the hybrid device. For example, a user interface may be provided on a display to allow a user to select the desired processor for any given desired function. Alternatively or additionally, a manual switch may be provided on the device such that a user may activate the manual switch to after the state of the switch 208.

In another example, a driver or switch module may be contained within both the lower power processor 201 and the high performance processor 202. If the low power processor 201 provides power to the peripheral devices (204, 205, 206, and 207) when a request input is received from a user for a high performance level function, a driver or module within the low power processor 201 may determine that the high performance processor 202 may perform the requested task. Alternatively, or additionally, the low power processor 201 may determine the inability to perform the requested task given the power level available to the low power processor 201. In such a case, the low power processor 201 may alter the state of the switch 208 such that the high performance processor 202 may provide the control and functionality requested by the user.

Conversely, if the high performance processor 202 provides functionality to the peripheral devices (204, 205, 206, 207), and a request input is received from a user for a function of low power requirements, the high performance processor 202 may determine that the function may be performed by the low power processor 201 via a driver or switch module within the high performance processor 202. Based on this determination, the driver or switch module in the high performance processor 202 may cause the switch 208 to change state such that the low power processor provides power and control to the peripheral devices (204, 205, 206, 207).

In addition, other peripheral devices may also be in connection with the low power processor 201 and/or the high performance processor 202. For example, a peripheral device (not shown) may be controlled or powered by the low power processor 201 while another peripheral device may be controlled or powered by the high performance processor 202. Either of the peripheral devices may be powered or controlled by the respective processor independent of the switch 208. For example, a processor may provide instructions to a corresponding peripheral device to operate the peripheral device.

In another example, any number of peripheral devices may be controlled or powered by a first processor in a computing device. The computing device may further include a second processor that is a higher performance processor than the first processor in the computing device. The first processor may be a lower power processor with reduced capacity and/or functionality and the second processor may be a higher power processor with a higher capacity than the lower power processor.

In a low power state in which low power functions are being performed by the computing device or associated peripheral devices, the lower power processor may control corresponding peripheral devices to perform the functions. However, as different functions are requested by a user, the power of the requested functions of the corresponding peripheral devices may exceed the capability of the lower power processor. For example, a first processor may be a low capacity processor (or energy-conserving) but with a limited range of functionality. When functions that are associated with a low level of power consumption (e.g., needed energy or power requirement is below a predetermined threshold), then the first processor may control the device and associated peripheral devices to perform the function. At the same time, the first processor consumes less power than a second processor of higher energy requirements.

If a function is requested needing higher levels of power or energy to perform, the first processor may be unable to coordinate or control the associated peripheral devices. For example, the first processor may consume less power or energy as compared to a second processor, however, the functionality of the first process may be decreased accordingly. Hence, control of the peripheral devices to perform the desired function may be via a second processor that is a high performance processor. The high performance processor may use more energy than the first processor. However, the high performance processor is capable of controlling the peripheral device in performance of functions of higher complexity or requiring an increased amount of power or energy.

Also in this example, the high performance processor may control the peripheral devices to perform a requested function via the low power processor (i.e., the first processor). A high performance or high capacity processor may power or control a second processor (i.e., a lower or reduced capacity processor) in a hybrid computing device. The high performance processor may further control or power additional peripheral devices for performing a requested function.

Figure 3:
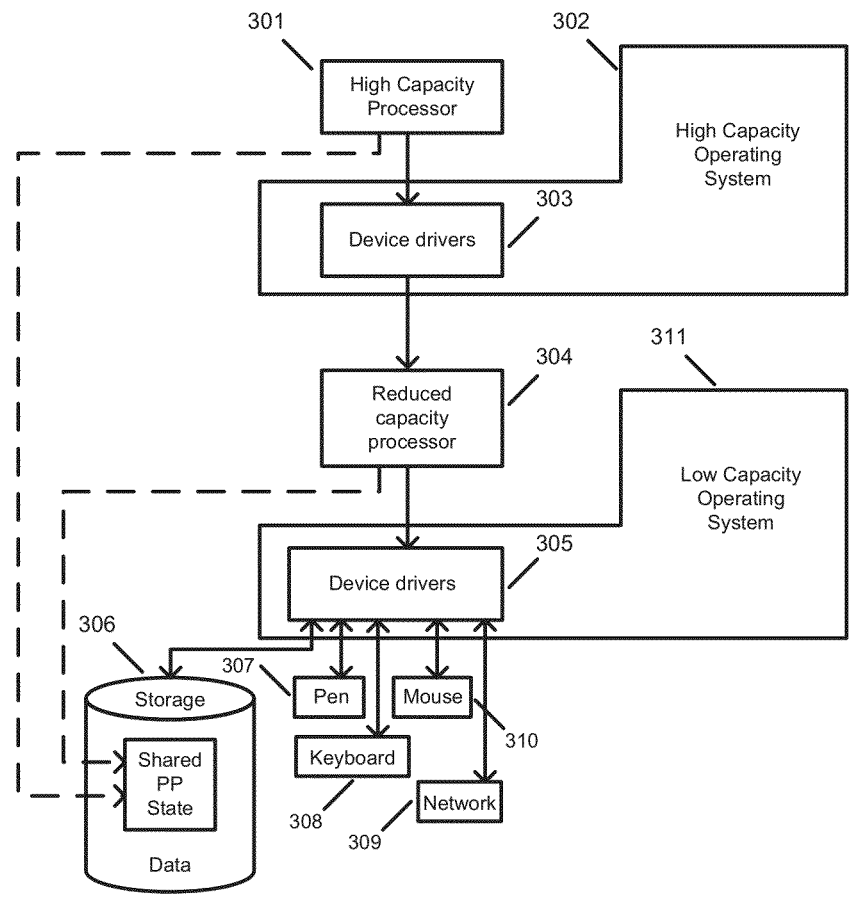
FIG. 3 illustrates an example of a hybrid computing device with multiple processors.

FIG. 3 illustrates an example of a hybrid computing device with multiple processors. In this example, the hybrid computing device includes a high capacity processor 301 that is capable of performing high power, speed, or high capacity functions or controlling peripheral devices in performing the high capacity functions. The high capacity processor 301 contains or executes an operating system 302 for controlling various high performance functions of the high capacity processor 301. As FIG. 3 illustrates, the high capacity processor 301 controls a reduced capacity processor 304 via a device driver 303. The reduced capacity processor 304, via device driver 305 controls and operates various peripheral devices and may execute a low capacity operating system 311. FIG. 3 illustrates examples of peripheral devices controlled by the reduced capacity processor 304 including a pen 307, a keyboard 308, a network card 309 and/or a mouse 310. These are merely examples as any peripheral device may be controlled by the processors of the hybrid computing device.

As can be seen in the example of FIG. 3, the high capacity processor 301 accesses the peripherals via the reduced capacity processor 304. In this example, the high capacity processor 301 does not access the peripheral devices (e.g., pen 307, keyboard 308, network 309 or mouse 310) directly. Instead, the high capacity processor 301 communicates with the peripheral devices (e.g., pen 307, keyboard 308, network 309 or mouse 310) via the reduced capacity processor 304. Hence, the device driver 303 of the operating system 302 of the high capacity processor 301 may operate with the reduced capacity processor 304 and the associated peripheral devices (e.g., pen 307, keyboard 308, network 309 or mouse 310) as a co-processor subsystem in which the reduced capacity processor 304 controls the peripheral devices to perform low capacity functions while the high capacity processor 301 may control the co-processor subsystem (i.e., the reduced capacity processor 304 and associated operating system and device drivers 305 and peripheral devices 307, 308, 309, and/or 310) to perform higher capacity functions. For example, high capacity functions may include functions that require a high level of power to perform or require a high processor speed to be performed. Conversely, a low capacity function may be performed by a low capacity processor and may include functions that require a low level of power or a low processor speed to be performed.

Conversely, if the high capacity processor 301 controls the co-processor subsystem (including the reduced capacity processor 304, low capacity operating system 311, and peripheral devices) and a request for a low power function, low speed function, or any other low capacity function is received, control of the device and peripheral devices may be switched, either automatically or manually, to the reduced capacity processor 304 which may execute a low capacity operating system 311. In this case, the high capacity processor 301 may either be powered off or may enter sleep mode while the reduced capacity processor 304 may continue to communicate with and control the peripheral devices (pen 307, keyboard 308, network 309, or mouse 310).

In addition, the high capacity processor 301 and the reduced capacity processor 304 may share data in storage 306. The data in storage 306 shared by the processors such as the high capacity processor 301 and the reduced capacity processor 304 may include state data. The state data may further maintain the state of the system if control of the peripheral devices (e.g., pen 307, keyboard 308, network 309, or mouse 310) switches from the reduced capacity processor 304 to the high capacity processor 301 or from the high capacity processor 301 to the reduced capacity processor 304. Also, if control of the peripheral devices switches from the reduced capacity processor 304 to the high capacity processor 301, the high capacity processor 301 may control or power the peripheral devices (e.g., pen 307, keyboard 308, network 309, or mouse 310) via the reduced capacity processor 304. Thus, in this example, the peripheral devices and the reduced capacity processor 304 form a subsystem which is controlled or powered by the high capacity processor 301. The high capacity processor 301 communicates with the peripheral devices through the reduced capacity processor 304 and the reduced capacity processor 304 communicates with the peripheral devices on behalf of the high capacity processor 301. Therefore, in this example, the high capacity processor 301 does not communicate directly with the peripheral devices (e.g., pen 307, keyboard 308, network 309, or mouse 310). Rather, the high capacity processor 301 communicates with the peripheral devices through the reduced capacity processor 304.

Figure 4:
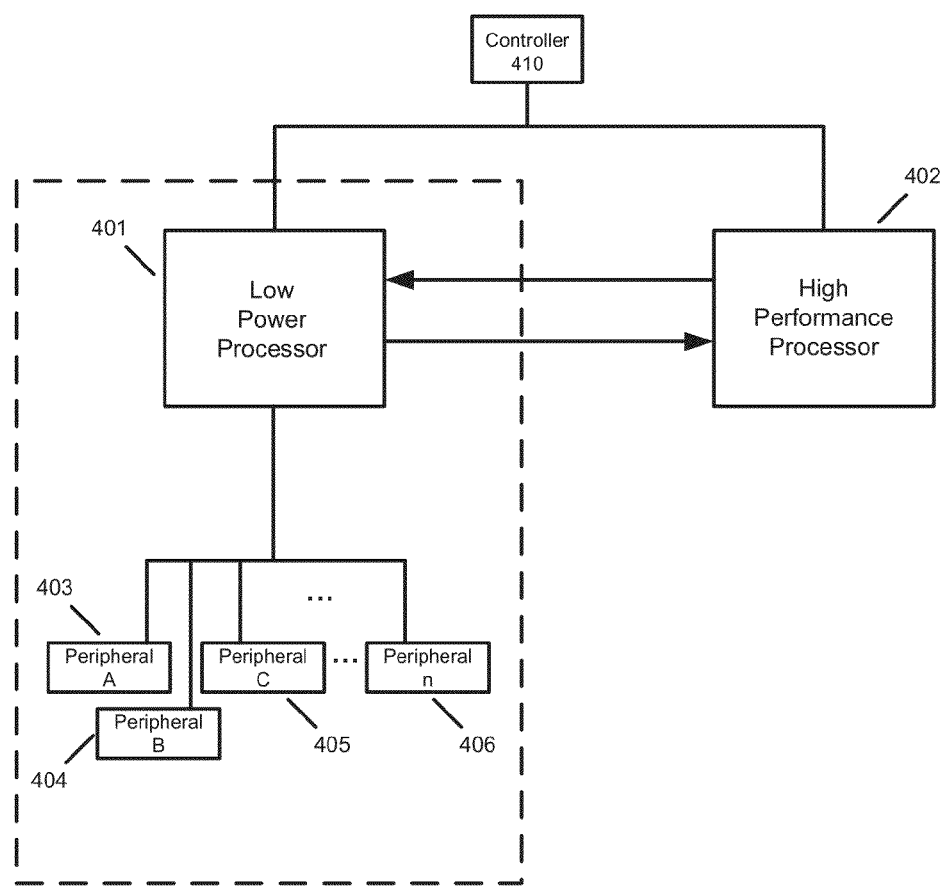
FIG. 4 illustrates another example of a hybrid computing device containing multiple processors.

FIG. 4 illustrates another example of a hybrid computing device containing multiple processors. In this example, a low power processor 401 and any number or type of peripheral devices (e.g., peripheral A-n 403-406) form a subsystem. In the subsystem, the low power processor 401 may communicate with or power or control any of the peripheral devices (403-406). The peripheral devices may include any type of peripheral device. Some non-limiting examples of peripheral devices that may be in communication with the low power processor 401 include a disk drive, a GPS unit, a 3G wireless card, a WiFi unit, audio system, video system, DVD unit, etc.

In this example, the low power processor 401 conserves energy and power by operating in a low power mode of power consumption. Thus, the life span of a power source powering the hybrid computing device may be prolonged when the low power processor 401 is operating to control the peripheral devices. However, if a high performance function is requested that the low power processor 401 is unable to perform, control of the hybrid computing device may switch to a high performance processor 402. The high performance processor 402 in this example is a separate and distinct processor in the hybrid computing device from the low power processor 401. In addition, the high performance processor 402 may perform high performance functions while the low power processor 401 may perform low performance functions. The high performance processor 402 may be any type of processor capable of performing a substantially full range of functions of a computing device which may include functions needing a high level of power or capability.

Control of peripheral devices with a high performance processor 402 may use an increased amount of power as compared to using a low power processor 401. In this case, a power source, such as a battery, may become depleted of power over a certain period of time with operation of the high performance processor 401 that is shorter than a period of time with operation of the low power processor 401. Hence, in this example, control of the peripheral devices may switch from the high performance processor 402 to the low power processor 401 when the functionality requested is capable of being performed with the low power processor 401. Conversely, control of the peripheral devices may switch from the low power processor 401 to the high performance processor 402 when the functionality requested is not capable of being performed with the low power processor 401. In addition, the high performance processor 402 may control or communicate with the peripheral devices through the low power processor 401 such that the high performance processor 402 does not communicate directly with the peripheral devices. Instead, the high performance processor 402 communicates with the low power processor 401 and the low power processor 401 communicates with or controls the peripheral devices on behalf of the high performance processor 402.

Also in this example, a user command may be received at a broker or controller 410. Based on the user command, a function may be performed by the computing system. In this example, one of the high performance processor 402 or the low power processor 401 may control any of the peripheral devices (e.g., peripheral A 403, peripheral B 404, peripheral C, or peripheral in 406) to perform the des red function. As described above, the high performance processor 402 may control the peripheral devices (e.g., 403, 404, 405, 406) via the low power processor 401 such that the low power processor 401 and the peripheral devices (e.g., 403, 404, 405, 406) form a subsystem. The high performance processor 402 controls the subsystem in this example by controlling the low power processor 401 to in turn control the peripheral devices.

The requested function may require a predetermined amount or level of power. The level of power to perform the function may vary depending on the function requested such that a low power function may require a low amount or level of power while a high power function may require a high amount or level of power. Thus, a low power function may use a lower amount of power than a high power function. The broker or controller 410 receives the user command and determines the power level of the requested function.

In this example, a user request is received by the broker or controller 410 to perform a certain requested function. Based on the level of power needed to perform the user request, the broker or controller 410 may determine if the low power processor is capable of controlling peripheral devices (e.g., 403, 404, 405, 406) to perform the requested function. For example, the low power processor 401 may have a maximum power level at which to operate and may be unable to control functions that require a power level greater than the maximum power level. The broker or controller 410 may determine that the maximum power level of the low power processor 401 is less than the power level required to perform the requested function and may cause the high performance processor 402 to control the performance of the requested function. In this case, the high performance processor 402 may control the low power processor 401 to operate peripheral devices (e.g., 403, 404, 405, 406) to perform the requested function.

Hence, the low power processor 401 controlling peripheral devices (e.g., 403, 404, 405, 406) may form a subsystem. The subsystem (including the low power processor 401 and the peripheral devices (e.g., 403, 404, 405, 406) may be controlled by the high performance processor 402. The high performance processor 402 controls the low power processor 401 in this example but controls the peripheral devices (e.g., 403, 404, 405, 406) via the low power processor 401. Hence, the high performance processor 402 in this example does not control the peripheral devices (e.g., 403, 404, 405, 406) directly but, rather, controls the peripheral devices via the low power processor 401.

The broker or controller 410 may select the processor for performing a user requested function in a variety of ways. For example, the broker or controller 410 may contain a table with commands or actions performed by the computer system with corresponding power level values. When a user command is received at the broker or controller 410, the broker or controller 410 may identify the corresponding power level and match the power level to a corresponding processor. For example, if the identified power level of a requested function is greater than a maximum power level of the low power processor 401, the broker or controller 410 may select the high performance processor for controlling the performance of the requested function via the low power processor 401. Conversely, if the broker or controller 410 identifies the power level of a requested function is less than a max mum power level of the low power processor 401, the broker or controller 410 may select the low power processor 401 to control peripheral devices to perform the requested function. In this case, the high performance processor 402 may enter sleep mode or may be powered off.

Figure 7:
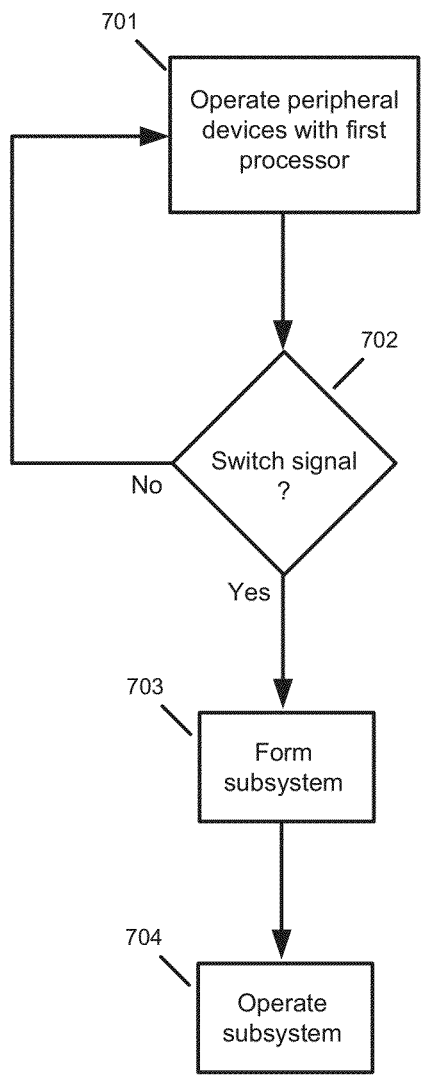
FIG. 7 is a flowchart illustrating one example of performing functions in a system with coprocessor coupling.

FIG. 7 is a flowchart illustrating one example of performing functions in a system with coprocessor coupling. In this example, peripheral devices are controlled by a first processor in a hybrid computing system (STEP 701). The peripheral devices may include, but are not limited to, for example, a disk drive, 3G unit, WiFi, mouse, keyboard, display, etc. In STEP 702, a switch signal or command is received at the system for indicating that control of the peripheral devices should switch to a second processor in the hybrid computing system (STEP 702). If no signal or command is received ("No" branch of STEP 702), the first processor (which may be a low power processor or a low speed processor) may control the peripheral devices or may communicate with the peripheral devices. If a signal or command is received to switch to the second processor ("YES" branch of STEP 702), a subsystem is formed (STEP 703). The second processor may be a processor that is separate and distinct from the first processor and may further have different functionality, processing speed, and/or power consumption characteristics. For example, the second processor may be a high performance or high capacity processor for implementing functions of higher complexity than the first processor (e.g., the low power or capacity processor). Also, the second processor may be a high speed processor for controlling the performance of functions requiring a high processing speed.

In this example, the subsystem formed in STEP 703 may include any number of peripheral devices in communication with the first processor where the first processor has low power consumption characteristics. Hence, operation of the low power processor (i.e., first processor) may consume less power than operation of the higher power processor (i.e., the second processor). Thus, by operating the low power processor instead of the operating the higher power processor, energy may be conserved and battery life may be extended. The low capacity processor may be selected for any low capacity feature. In addition or alternatively to selecting the low capacity processor based on low power consumption, the low capacity processor may be selected based on a low processing speed.

Responsive to receiving the switch signal or command ("Yes" branch of STEP 702) and forming the subsystem (STEP 702) of a low power processor in connection and in communication with any number of peripheral devices for performing a desired function, a second (i.e., higher power processor) may operate the subsystem with a second processor (STEP 704). The second processor may be separate and distinct from the first processor and may have higher power consumption characteristics. Also, the second processor may be capable of performing higher complexity functions as compared to the first processor or may be capable of functioning at a higher processing speed.

In operating the subsystem, the higher power processor (second processor) communicates with or controls the lower power processor (first processor). Also, the higher power processor may not communicate directly with the peripheral devices of the system. Instead, the higher power processor may communicate with or control the lower power processor, which may in turn communicate with or control the peripheral devices. In this example, any information such as control information exchanged between the peripheral devices and the low power processor may be communicated to the high power processor via the low power processor. Thus, the low power processor communicates with or controls the peripheral devices on behalf of the high power processor for high performance functions.

The switch signal (STEP 702) may be of various types. In one example, a user may request a particular function that requires a certain level of power consumption. In this case, the level of power needed to perform the requested task may be determined and may be matched to a power level of a processor in the device. If the power needed to perform the requested task is greater than a predetermined amount and if the low power processor is controlling or powering the peripheral devices, the switch signal may be generated in response to the determination that the low power processor is incapable of performing the requested task. Alternatively or additionally, the user may request a particular function that requires a certain processing speed. In this example, the processing speed needed to perform the requested task may be determined by matching with processing speed of a corresponding processor. The processor may thus be selected based on matching processing speed needs of the requested function and the processing speed capability of the selected processor.

Conversely, if the high power processor is controlling the low power processor (and the low power processor is in communication with the peripheral devices on behalf of the high power processor) and a user requests a function needing a low level of power (i.e., the level of power of the requested function is less than a predetermined level), then a switch signal may be generated such that, responsive to the switch signal, control of the peripheral devices may switch from the high power processor controlling the low power processor to control the peripheral devices to the low power processor controlling the peripheral devices without the high power processor. In this example, the high power processor may be powered off to conserve energy or may enter sleep mode.

Also, state may be preserved for the activities and functions of the device during switching of control from one processor to another. For example, a subsystem including a low power processor and any number of peripheral devices may be providing a desired functionality when control switches over to a high power processor. The high power processor gains control of the system of does not access the peripheral devices directly. Instead, the high power processor communicates via the low power processor to the peripherals where a device driver views the low power processor and the peripheral devices as a multifunctional peripheral device. As one example to illustrate, the functionality provided by a subsystem (e.g., low power processor and peripheral devices) may be GPS. When additional power is needed for a requested function, control may switch to a high power processor such that the high power processor control and communicates with the low power processor but does not communicate directly with the peripheral devices. Instead the low power processor communicates with the peripheral devices on behalf of the high power processor. Hence, during switching of control from one processor to another, an operating system associated with the high power processor may view the subsystem as a multifunctional peripheral device and connections previously maintained may be continued to be maintained during and after the switch of control to the high power processor. In this way, the state of each of the peripheral devices may be preserved during switching of control between processors. Also, state of the peripheral devices may be preserved or maintained at any number of levels. For example, application level state, operating system level state and/or construction level state may be preserved during switching of control between processors. This may result in an uninterrupted user experience.

Figure 8:
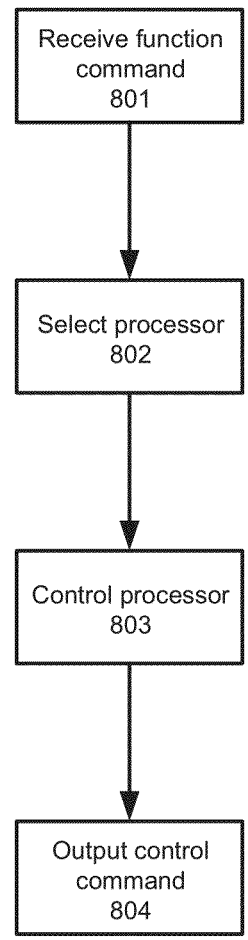
FIG. 8 is a flowchart illustrating another example of performing functions in a system with coprocessor coupling.

FIG. 8 is flowchart illustrating another example of a method for controlling a computing system. In this example, a function command 801 is received at the computer system. The further command may be a request for performance of a function or task. The command or request may be received at the computing system from a user, for example. The command or request may be input via a peripheral device from the user.

Based on the function requested, a processor may be selected (STEP 802). In this example, the computing system may contain multiple processors. Any of the processors may operate any level of performance or power. For example, one processor may be a low power processor while another processor may be a high power processor. The low power processor in this example operates at a lower power consumption level or at a lower level of power characteristics than the high power processor. In one example, the low power processor, operating at a lower level of power characteristics, is capable of controlling peripheral devices in the performance of certain types of functions. However, the low power processor may not be capable of controlling the peripheral devices to perform certain other types of functions. For example, certain types of functions may require a certain level of power to be performed by the peripheral devices. The level of power needed may exceed the capabilities of the low power processor. In this example, the high power processor may be selected to perform the requested high power functions.

In STEP 803, the selected processor may be controlled by another processor. For example, if the requested function from STEP 801 is a high power function which necessitates a level of power that is greater than the available amount of power provided by the low power processor, the high power processor may be selected for controlling the performance of the requested function. In this example, the selected high power processor may control the low power processor (STEP 803) such that the low power process may control the peripheral devices to perform the requested function based on input commands from the high power processor. Hence, in STEP 804 in this example, the low power processor may output control commands to any number of peripheral devices to control the peripheral devices to perform the requested function. The low power processor is, in turn, controlled by the high power processor. In this example, the low power processor and the peripheral devices form a subsystem which is controlled by the high power processor. The high power processor does not connect directly to the peripheral devices but controls the peripheral devices via the low power processor.

Figure 9:
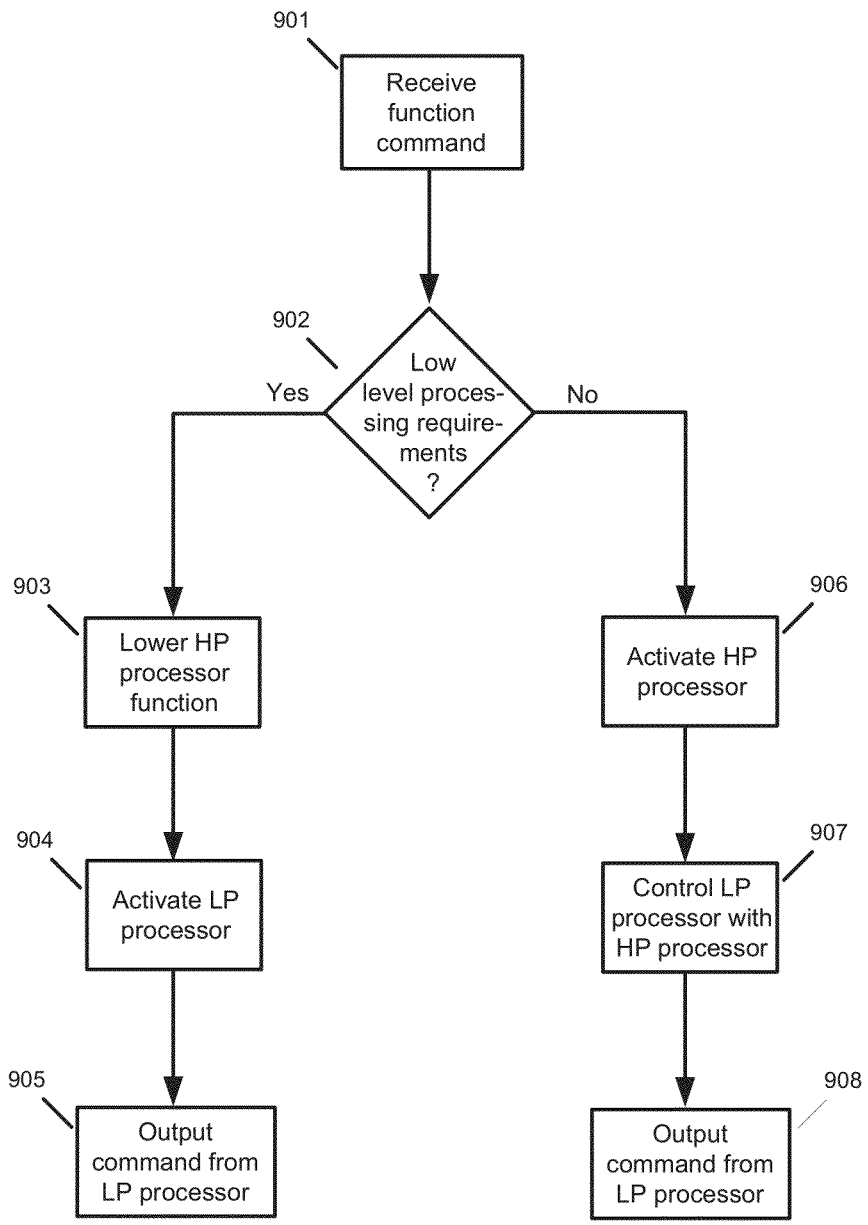
FIG. 9 is a flowchart illustrating another example of controlling function in a coprocessor-coupled system.

FIG. 9 is a flowchart illustrating another example of controlling a computing system to perform a requested function. In this example, a function command is received (STEP 901). The function command may contain a request for performance of a particular function. The command or request may be received, for example, from a user.

In STEP 902, processing requirements of the requested function is determined. The system may contain multiple processors and any of the multiple processors may have different capabilities or functionalities or may possess different functioning levels. For example, one processor may be a low power processor while another processor may be a high power processor with different power level characteristics or different power functions/capabilities. In another example, one processor may be capable of operating at a particular processing speed while another processor may be capable of operating at a processing speed that is faster than the first processor. A processor may be selected for controlling the performance of the requested function based on processing preferences or requirements of a requested function and a functioning capability of a corresponding processor.

For example, the power level of the requested function may be compared to a power level characteristics of any number of processors of the system. The power level of the requested function is compared to a power consumption or power characteristic level of any of the processors in the multiple of processors. Based on the comparison, a processor may be selected for controlling peripheral devices in the performance of a requested function. In another example, a processing speed of a requested function may be compared to respective processing speeds of any number of processors of the system. Based on the comparison, a processor may be selected for controlling peripheral devices in the performance of a requested function based on a selection of a processor capable of functioning at a required processing speed.

For example, if the power level of the requested function is less than or equal to the power level characteristics of a processor or if a desired processing speed of the requested function is less than or equal to a processing speed of a processor ("Yes" branch of STEP 902), the processor may be selected for operating to perform the requested function. In this example, the requested function may require an amount of power to be performed that is less than or equal to power level characteristics or power consumption levels of a low power processor or the requested function may require a processing speed to be performed that is less than or equal to a processing speed of a low speed processor. The low power (and/or speed) processor may thus be selected to control the peripheral devices in the performance of the requested function. Also, functioning of a high power processor or a high speed processor may be reduced (STEP 903). For example, the high power processor or high speed processor may be reduced in power or operation (e.g., placed into a sleep mode) to conserve power. The high power processor or high speed processor in this example may thus be set to conserve power or function during the performance of the requested function. In another example, the high power processor or high speed processor may be shut down during the performance of the requested function.

In STEP 904, the selected low power processor or low processor speed processor may be activated to control the performance of the requested function. For example, the low power processor or low speed processor may output commands (STEP 905) to any number or type of peripheral devices perform the requested function. In this example, the power requirements or speed requirements of the requested function is within the capabilities of the low power or low speed processor. Hence, the low power or low speed processor may control the peripheral devices to perform the function while the high power or high speed processor may be reduced in function (e.g., shut down or placed into sleep mode).

If the requested function has a power requirement that exceeds the level of power available from the low power processor ("No" branch of STEP 902), the high power processor may be selected to provide control in the performance of the requested (high power) function. Alternatively, if the requested function has a processing speed requirement that exceeds the processing speed of the low speed processor ("No" branch of STEP 902), the high speed processor may be selected to provide control in the performance of the requested (high speed) function. In this case, the high power processor or high speed processor may be activated (STEP 906). The high power processor or high speed processor may not be connected to the peripheral devices, however, the low power processor or low speed processor may be connected to the high power processor or low speed processor and the peripheral devices. In this example, the high power processor or high speed processor is connected to the low power processor or low speed processor and controls the low power/speed processor (STEP 907). The low power or low speed processor, based on control input from the high power or high speed processor may control the peripheral devices to perform the requested function (STEP 908). Hence, the low power or low speed processor and the peripheral devices may form a subsystem for performing the requested function. The high power or high speed processor controls the subsystem formed by the low power or low speed processor and the peripheral devices to perform the requested function. Thus, in this example, the high power or high speed processor operates to perform the requested function by the peripheral devices via the low power processor or low speed processor.

Figure 5:
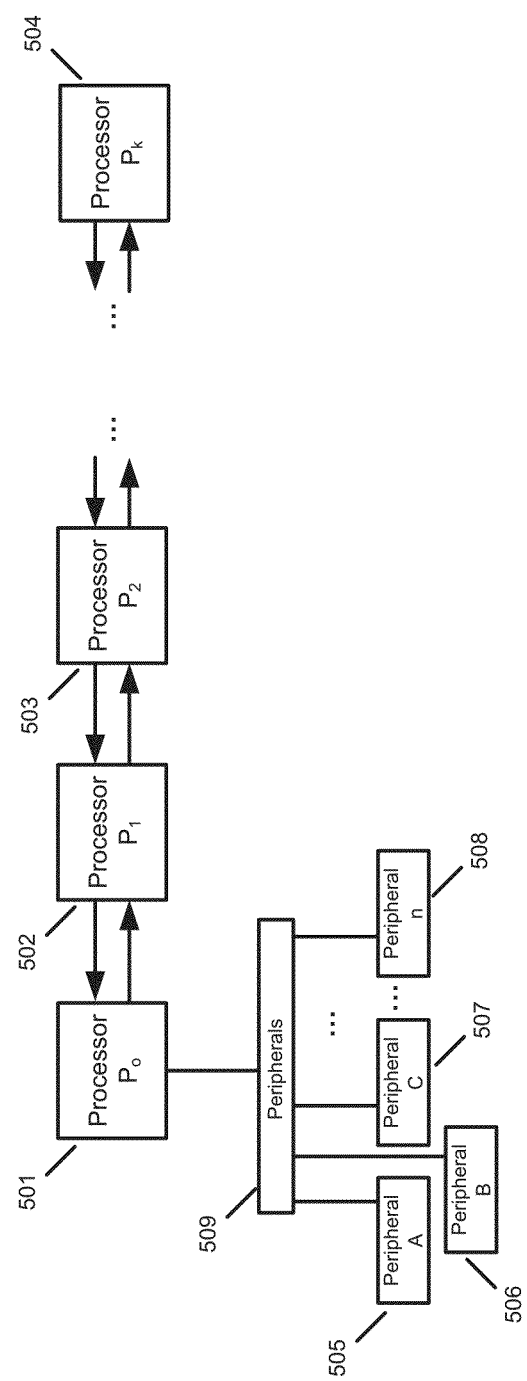
FIG. 5 is a block diagram illustrating an example of multiple processors for controlling peripheral devices in a hybrid computing environment.

FIG. 5 is a block diagram illustrating an example of multiple processors for controlling peripheral devices in a hybrid computing environment. In this example, any number of processors may be connected in series. In addition, the different processors may have capabilities and/or functionalities. For example, different processors may be capable of performing functions at different processing speeds or may be capable of performing functions with different power requirements or different power consumption levels and different functionalities. For example, a first processor $P_o$ 501 may be a low power processor with limited functionality. When low complexity functions are being performed by the hybrid computing device that processor $P_o$ may control, processor $P_o$ may be invoked to perform the requested low complexity function.

As FIG. 5 illustrates, additional processors may be provided at different power levels. For example, processor P1 502 may be connected to processor $P_o$ 501 and may be a higher power consumption processor as compared to processor $P_o$ 501. If a requested function has a complexity that is greater than the capacity of processor $P_o$ 501, the processor 502 may be invoked such that control may switch to processor 502. A signal to switch processors may be generated either automatically such as by receiving a request for a high capacity or high power function that is greater than the capability of the currently active processor or may be generated manually (e.g., a user may provide a request to switch processors). When control switches to processor 502, processor 501 continues to communicate with the peripheral devices. However, control of the peripheral devices may be provided by processor 502 through processor 501. Processor 502, in this example, does not communicate directly with the peripheral devices but, rather, controls the peripheral devices through processor 501. Hence, processor 501 and the peripheral devices form a subsystem which is controlled collectively by processor 502.

If a requested function has power needs that exceed the capacity of processor 502, then a higher capacity processor (e.g., process 503) may be invoked to provide control of the peripheral devices via lower power processors (in this case, processors 501 and 502). For example, a requested function may need a level of capacity or function that exceeds both processor 501 and processor 502. In this case, processor 503 may be invoked such that processor 503 controls the peripheral devices via processor 502 and processor 501. Processors 503 and 502 do not communicate directly with the peripheral devices in this example. Rather, processor 503 communicates with the peripheral devices via processors 502 and 501 and processor 502 communicates with the peripheral devices via processor 501.

Also illustrated in FIG. 5, any number of processors may be provided in the hybrid computing device for controlling and powering peripheral devices. In this example, k processors are provided for controlling peripheral devices in performing a requested function. In this case, processor 504 may be a high capacity processor that may provide substantially all available functions. The requested function requires any level of power and may be of any complexity level. Based on the power level of the requested function or the complexity level of the request, a corresponding processor may be invoked to control the peripheral devices. As described, each higher power processor may not communicate directly with the peripheral devices. Rather, each higher power processor may communicate with the peripheral devices via lower power processors such that the lower processors may communicate with peripheral devices on behalf of the higher power processors. For example, processor 502 may not communicate directly with the peripheral devices hut may communicate with the peripheral devices through processor 501. Similarly, processor 503 may communicate with the peripheral devices via processor 501 and processor 502.

When a requested function is a low capacity function and a higher power processor controls the peripheral devices (via lower power processors), a switch signal may be generated such that responsive to the switch signal, control of the peripheral devices may switch to a lower power processor. For example, a lowest power processor capable of providing the requested function may be selected for control of the peripheral devices. In this way, a minimum amount of power may be required for providing the requested function and power may be conserved. This may, in turn, increase battery life.

Figure 6:
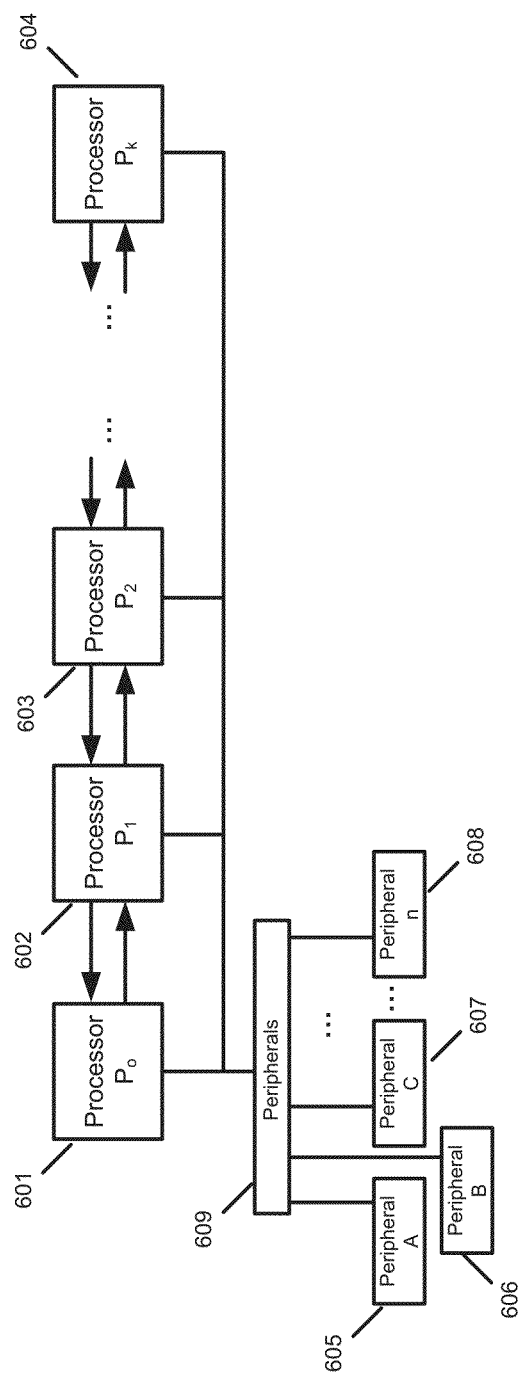
FIG. 6 illustrates another example of multiple processors providing control of peripheral devices in a hybrid computing device.

FIG. 6 illustrates another example of multiple processors providing control of peripheral devices in a hybrid computing device. In this example, the multiple processors may be connected in a parallel configuration such that different functionalities may select a corresponding processor. For example, different processors having different power consumption characteristics may be present. In this example, processor 601 may be a low power or low capacity processor, processor 602 may be a higher capacity processor, processor 603 may be a processor of higher capacity than processor 602 but lower capacity then processor 604. Processor 604 may be the highest capacity processor. Depending on the requested functionality, a corresponding processor may be selected for controlling the peripheral devices (605-608) via a peripheral device driver 609. The processors 601-604 may be connected in parallel such that each processor 601-604 may act independently. For example one processor may be a gaming core, one an Office core, etc.

It is understood that aspects of the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

The invention claimed is:

1. A computing device comprising:
   a high-capacity processor;
   a reduced-capacity processor relative to the high-capacity processor;
   a peripheral device; and
   at least one program module, via which the computing device is configured to:
   control the reduced-capacity processor by the high-capacity processor, where the high-capacity processor executes a first operating system, and where the reduced-capacity processor executes a second operating system;
   control the peripheral device by the reduced-capacity processor; and
   switch control of the peripheral device from the reduced-capacity processor to the high-capacity processor via the reduced-capacity processor.

2. The computing device of claim 1 further configured to preserve state of the peripheral device through the switched control of the peripheral device.

3. The computing device of claim 2 wherein state of the peripheral device is shared by the reduced-capacity processor and the high-capacity processor.

4. The computing device of claim 2 further comprising a memory device that stores state data that is shared by the reduced-capacity processor and the high-capacity processor.

5. The computing device of claim 4 wherein the state data includes data corresponding to the state of the peripheral device.

6. The computing device of claim 1 wherein switching control of the peripheral device from the reduced-capacity processor to the high-capacity processor via the reduced-capacity processor is in response to a request for a function that the reduced-capacity processor is unable to perform.

7. The computing device of claim 1 wherein the high-capacity processor is in asleep mode or a reduced-power mode during control of the peripheral device by the reduced-capacity processor.

8. A method performed on a computing device comprising that includes a high-capacity processor, a reduced-capacity processor relative to the high-capacity processor, a peripheral device, and at least one program module, the method comprising:
   controlling the reduced-capacity processor by the high-capacity processor, where the high-capacity processor executes a first operating system, and where the reduced-capacity processor executes a second operating system;
   controlling the peripheral device by the reduced-capacity processor; and
   switching control of the peripheral device from the reduced-capacity processor to the high-capacity processor via the reduced-capacity processor.

9. The method of claim 8 further comprising preserving state of the peripheral device through the switching.

10. The method of claim 9 wherein state of the peripheral device is shared by the reduced-capacity processor and the high-capacity processor.

11. The method of claim 9, the computing device further comprising a memory device that stores state data that is shared by the reduced-capacity processor and the high-capacity processor.

12. The method of claim 11 wherein the state data includes data corresponding to the state of the peripheral device.

13. The method of claim 8 wherein the switching is in response to a request for a function that the reduced-capacity processor is unable to perform.

14. The method of claim 8 wherein the high-capacity processor is in a sleep mode or a reduced-power mode during the controlling the peripheral device by the reduced-capacity processor.

15. A computing device comprising:
    a high-capacity processor;
    a reduced-capacity processor relative to the high-capacity processor;
    a peripheral device; and
    at least one program module via which the computing device is configured to:
    control the peripheral device by the reduced-capacity processor;
    switch control of the peripheral device from the reduced-capacity processor to the high-capacity processor via the reduced-capacity processor; and
    preserve state of the peripheral device through the switched control of the peripheral device.

16. The computing device of claim 15 wherein the state of the peripheral device is shared by the reduced-capacity processor and the high-capacity processor.

17. The computing device of claim 15 further comprising a memory device that stores state data that is shared by the reduced-capacity processor and the high-capacity processor.

18. The computing device of claim 17 wherein the state data includes data corresponding to the state of the peripheral device.

19. The computing device of claim 15 wherein switching control of the peripheral device from the reduced-capacity processor to the high-capacity processor via the reduced-capacity processor is in response to a request for a function that the reduced-capacity processor is unable to perform.

20. The computing device of claim 15 wherein the high-capacity processor is in asleep mode or a reduced-power mode during control of the peripheral device by the reduced-capacity processor.

* * * * *